United States Patent
Wang et al.

(10) Patent No.: US 12,172,197 B2
(45) Date of Patent: Dec. 24, 2024

(54) LASER CAVITATION COMPOSITE ULTRASONIC CLEANING DEVICE AND CLEANING METHOD FOR CONNECTING ROD

(71) Applicant: GUANGDONG UNIVERSITY OF TECHNOLOGY, Guangzhou (CN)

(72) Inventors: Guan Wang, Guangzhou (CN); Junxian Li, Guangzhou (CN); Sihao Lin, Guangzhou (CN); Jieyu Zhu, Guangzhou (CN); Guohua Chen, Guangzhou (CN); Chong Zhang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 394 days.

(21) Appl. No.: 17/878,558

(22) Filed: Aug. 1, 2022

(65) Prior Publication Data
US 2023/0294143 A1 Sep. 21, 2023

(30) Foreign Application Priority Data
Mar. 15, 2022 (CN) .......................... 202210255775.8

(51) Int. Cl.
*B08B 3/12* (2006.01)
*B08B 7/00* (2006.01)

(52) U.S. Cl.
CPC .............. *B08B 3/12* (2013.01); *B08B 7/0042* (2013.01)

(58) Field of Classification Search
None
See application file for complete search history.

(56) References Cited

U.S. PATENT DOCUMENTS

2017/0203385 A1\* 7/2017 Ren ..................... G01N 21/1717

FOREIGN PATENT DOCUMENTS

| CN | 114602884 A | 6/2022 |
| CN | 114653672 A | 6/2022 |
| CN | 114653677 A | 6/2022 |

\* cited by examiner

*Primary Examiner* — Cristi J Tate-Sims

(57) ABSTRACT

Provided are a laser cavitation composite ultrasonic cleaning device and cleaning method for a connecting rod, which belong to the technical field of bushing gap cleaning of engine connecting rods. Provided are a laser cavitation composite ultrasonic cleaning device and cleaning method for a connecting rod, the cleaning device comprises a cleaning tank, a bracket, a low-frequency ultrasonic vibrator, a first laser head, and a second laser head; the low-frequency ultrasonic vibrator is located on an outer side of a bottom portion of the cleaning tank; the first laser head is located above the bracket, and the second laser head is located at a lower portion in the cleaning tank. According to the cleaning device, laser light is combined with an ultrasonic wave, cooperated with light path assemblies, and the laser light is focused in a bolt hole and a bushing gap of the connecting rod.

10 Claims, 9 Drawing Sheets

LASER CAVITATION COMPOSITE ULTRASONIC CLEANING DEVICE AND CLEANING METHOD FOR CONNECTING ROD

CROSS REFERENCE TO RELATED APPLICATIONS

This application claims foreign priority of Chinese Patent Application No. 202210255775.8, filed on Mar. 15, 2022 in the China National Intellectual Property Administration, the disclosures of all of which are hereby incorporated by reference.

TECHNICAL FIELD

The present invention relates to the technical field of engine connecting rod cleaning, and more particularly, to a laser cavitation composite ultrasonic cleaning device and cleaning method for a connecting rod.

BACKGROUND

As an important part of an automobile engine, connecting rod bears a high periodic load in operation and undergoes complicated stress, so the assembly requirement of the connecting rod is very high. During a series of machining of the engine connecting rod, a lot of residual metal chips and rust-proof oil dirt are left on a surface and a gap of a workpiece, which not only easily scratches inner surfaces of big and small heads with extremely high accuracy requirements of the connecting rod, but also are not conducive to heat transfer when the connecting rod is operated, thus seriously affecting a working performance of the connecting rod assembled with an engine and a crankshaft. Therefore, before leaving the factory, the connecting rod must undergo a series of cleaning, and the cleanliness of the connecting rod is used as an important indicator of a quality of a finished product.

Laser machining is a mature and mainstream machining method at present, in which energy of light is used to pass through a lens to be focused at a focal point, to reach a very high energy density, and the machining is carried out through a photothermal effect. Laser machining does not need tools, has a high machining speed and small surface deformation, may be used for machining various materials, and has the advantages of high machining accuracy and good machining quality. With the localization of laser devices, laser machining is widely used in various machining occasions, comprising the field of cleaning.

In ultrasonic cleaning technology, the cavitation, acceleration, and direct inflow of an ultrasonic wave in liquid are used to disperse, emulsify and peel off a dirt layer, to achieve the purpose of cleaning. Due to a high frequency and a short wavelength, the ultrasonic wave has a good propagation direction and a strong penetration capability, thus having a fast cleaning speed and a good cleaning effect. Meanwhile, the technology saves solvent, heat energy, workplace, and labor, and it is not necessary to touch a cleaning solution by hand, thus being green and safe.

Existing cleaning devices mostly clean a bushing gap of a small head hole and a bolt hole of the connecting rod separately by using a high-pressure water jet, thus having a low cleaning efficiency and an insufficient cleaning accuracy; or clean whole bodies of a batch of connecting rods by using a single-frequency/multi-frequency ultrasonic wave, thus having a poor cleaning effect on fine particles stuck in the bushing gap of the small head hole and the bolt hole.

The prior art at least has the following defects:

1. there are few cleaning methods and devices for the bushing gap of the small head hole and the bolt hole of the connecting rod in the market, especially for cleaning bushing gaps of some novel connecting rods, and at present, most enterprises mainly use a manual hand-held high-pressure spray gun to clean the gap, which has a slow cleaning rate, thus restricting the improvement of production efficiency, and slowing down a production rhythm of front-end batch machining;
2. in traditional manual high-pressure spray cleaning, a worker needs to hold a high-pressure water jet spray gun in a cleaning room to clean the gap, there is loud noise during cleaning, and the volatilization of chemical substances in the cleaning solution endangers the health of the worker, thus being even more inconsistent with the concept of green industry; and
3. the existing cleaning devices in the market are difficult to meet the cleanliness requirement of the connecting rod, especially for some new cleaning methods, such as electrolytic cleaning, ultraviolet cleaning, plasma cleaning, and PIG cleaning, which are still in the experimental stage under existing technological conditions, a workpiece of certain material and shape is needed to achieve a good cleaning effect, but current technology is immature, with a high cleaning cost, thus being unable to be put into mass production for the present.

SUMMARY

To solve the technical problems in the prior art, the present invention provides a laser cavitation composite ultrasonic cleaning device and a cleaning method for a connecting rod. The cleaning device comprises a cleaning tank, a bracket, a low-frequency ultrasonic vibrator, a first laser head, and a second laser head; the low-frequency ultrasonic vibrator is located on the outer side of the bottom portion of the cleaning tank; the first laser head is located above the bracket, with a light emitting direction vertical to a horizontal plane; the second laser head is located at a lower portion in the cleaning tank, with a light emitting direction vertical to the horizontal plane; the first laser head comprises a first laser and a first lens assembly, and the first lens assembly is arranged at a front end of a light emitting direction of the first laser, and the second laser head comprises a second laser and a second lens assembly, and the second lens assembly is arranged at a front end of a light emitting direction of the second laser. During cleaning, the connecting rod is placed on the bracket, and at the moment, the first laser head is located above a bolt hole of the connecting rod, and the second laser head is located on two sides of a bushing gap; and laser light is continuously focused in the bolt hole and the bushing gap of the connecting rod in a form of pulse to instantly induce and excite a micro cavitation bubble nucleus, which rapidly grows and collapses under excitation of a low-frequency ultrasonic wave to generate a shock wave and a micro-jet, to clean an internal thread surface of the bolt hole and the bushing gap. According to the cleaning device, the laser light is combined with the ultrasonic wave, cooperated with light path assemblies, the laser light is focused in the bolt hole and the bushing gap of the connecting rod, and the low-frequency ultrasonic wave is combined to generate the shock wave and the micro-jet so that the internal thread surface of the bolt hole and the bushing gap are comprehensively cleaned.

The present invention provides a laser cavitation composite ultrasonic cleaning device for a connecting rod, used for cleaning a bolt hole and a bushing gap of the connecting rod, comprising a cleaning tank, a bracket, a low-frequency ultrasonic vibrator, a first laser head, and a second laser head; wherein:

the bracket is arranged in the middle of the cleaning tank; the low-frequency ultrasonic vibrator is located on the outer side of the bottom portion of the cleaning tank, and the low-frequency ultrasonic vibrator is connected to an upper computer, and controlled by the upper computer;

the first laser head is located above the bracket, with a light emitting direction vertical to a horizontal plane; and the second laser head is located at a lower portion in the cleaning tank, with a light emitting direction parallel to the horizontal plane;

the first laser head comprises a first laser and a first lens assembly, and the first lens assembly is arranged at a front end of a light emitting direction of the first laser;

the second laser head comprises a second laser and a second lens assembly, and the second lens assembly is arranged at a front end of a light emitting direction of the second laser;

the first laser head is capable of focusing laser light in the bolt hole; and the second laser head is capable of focusing the laser light in the bushing gap.

Preferably, the first lens assembly comprises a first beam expanding and collimating lens set, an x-y galvanometer set, and a first focusing lens set, the first beam expanding and collimating lens set, the x-y galvanometer set, and the first focusing lens set are sequentially arranged along the light emitting direction of the first laser; and the x-y galvanometer set and the first focusing lens set are both connected with the upper computer, and controlled by the upper computer.

Preferably, the x-y galvanometer set comprises a first galvanometer lens, an x-vibration motor, and a y-vibration motor, and the x-vibration motor and the y-vibration motor respectively control the vibration of the first galvanometer lens in an x direction and a y direction, so that a focal point of the laser light is capable of moving in an x-y plane, and the x-y plane is the horizontal plane.

Preferably, the first focusing lens set comprises a guide rail, a third focusing lens, a fourth focusing lens, a first servo motor, and a second servo motor, the third focusing lens, and the fourth focusing lens are connected with the guide rail through a slider and are capable of moving along an extension direction of the guide rail, the first servo motor, and the second servo motor are respectively connected with the third focusing lens and the fourth focusing lens, the first servo motor and the second servo motor are both controlled by the upper computer, rotation frequencies of the first servo motor and the second servo motor are the same as a laser pulse frequency, and initial rotation angles of the first servo motor and the second servo motor are randomly generated by the upper computer.

Preferably, the second lens set comprises a second beam expanding and collimating lens set, a focusing and collimating lens set, a reflecting galvanometer set, a completely reflecting lens, and a second focusing lens; the second beam expanding and collimating lens set, the focusing and collimating lens set, the reflecting galvanometer set, the completely reflecting lens and the second focusing lens are sequentially arranged along the light emitting direction of the second laser; and the reflecting galvanometer set is connected with the upper computer, and controlled by the upper computer.

Preferably, the reflecting galvanometer set comprises a second galvanometer lens and a third servo motor, the second galvanometer lens is connected with the third servo motor, the second galvanometer lens is parallel to the completely reflecting lens, and the third servo motor is controlled by the upper computer, a rotation frequency of the third servo motor is the same as the laser pulse frequency, and an initial rotation angle of the third servo motor is generated by the upper computer.

Preferably, the initial rotation angle $\theta$ of the third servo motor satisfies all the following conditions:

$\theta$ is incapable of being evenly divided by 360;

$\theta$ is no less than $(360*d)/(2\pi r)$;

a minimum common factor of $\theta$ and 360 is no greater than n;

wherein, r is a circumferential radius of the bushing gap, in a unit of mm;

d is a distance between focal points of two adjacent pulse laser lights forming cavitation bubbles, in a unit of mm; and n is a number of turns of the focal point of the laser light along the circumference of the bushing gap from a start to a dot that is dotted for the first time.

Preferably, the laser cavitation composite ultrasonic cleaning device for the connecting rod further comprises two infrared high-speed cameras, wherein the two infrared high-speed cameras are both connected with the upper computer, the two infrared high-speed cameras respectively aim at the bolt hole and the bushing gap for shooting, and a shooting treatment and a feedback process of any infrared high-speed camera are as follows:

transmitting a picture shot by the infrared high-speed camera to the upper computer, and pre-treating the picture preliminarily positioning a light spot of the focal point;

carrying out curve fitting on an edge of the light spot by a fuzzification treatment and a binarization treatment to obtain a regular ellipse;

when a short axis of the ellipse is less than a preset length, reading coordinates of a center of the ellipse, otherwise, not reading the coordinates; and carrying out a statistical treatment on coordinates of centers of all ellipses to judge whether a preset uniformity is satisfied; when the preset uniformity is not satisfied, adjusting positions of light path assemblies; and when the preset uniformity is satisfied, judging whether a preset number of times is continuously satisfied; when the preset number of times is continuously satisfied, suspending the shooting for a predetermined time, and when the preset number of times is not continuously satisfied, continuing the shooting.

Preferably, the preliminary positioning of the light spot of the focal point comprises color recognition and shape recognition, and specifically comprises the following steps:

carrying out a graying treatment on the picture, carrying out edge extraction by using a Prewitt operator, and then carrying out a binarization treatment to determine a search range of colored point pairs;

searching the colored point pairs; and carrying out the shape recognition to highlight the position of the light spot, and carrying out several morphological closing operations and erosion operations on the image to preliminarily determine the position of the light spot.

Preferably, the pre-treating comprises filtration, noise reduction, and enhancement of the picture.

The present invention provides a laser cavitation composite ultrasonic cleaning method for a connecting rod, wherein the method uses any laser cavitation composite ultrasonic cleaning device for the connecting rod above, and comprises a cleaning method for a bolt hole of the connecting rod, which specifically comprises the following steps of:

emitting pulsed laser light by a first laser, wherein the pulsed laser light passes through a first lens assembly and then is focused in a cleaning solution in the bolt hole;

exciting cavitation by the laser light to generate a microbubble nucleus in the cleaning solution;

allowing the bubble nucleus to rapidly grow and collapse under excitation of the low-frequency ultrasonic vibrator to generate a shock wave and a micro-jet; and cleaning an internal thread surface of the bolt hole by the micro-jet.

Preferably, the cleaning method for the bolt hole of the connecting rod further comprises: shooting the bolt hole through an infrared high-speed camera, judging whether a statistical result of coordinates of a center of an ellipse in a picture treatment result satisfies a preset uniformity, and when the statistical result does not satisfy the preset uniformity, adjusting positions of optical elements in the first lens assembly to shoot again.

The present invention provides a laser cavitation composite ultrasonic cleaning method for a connecting rod, wherein the method uses any laser cavitation composite ultrasonic cleaning device for the connecting rod above, and comprises a cleaning method for a bushing gap of the connecting rod, which specifically comprises the following steps of:

emitting pulsed laser light by a second laser, wherein the pulsed laser light passes through a second lens assembly and then is focused in a cleaning solution inside the bushing gap of a small head hole of the connecting rod;

exciting cavitation by the laser light to generate a microbubble nucleus in the cleaning solution;

allowing the bubble nucleus to rapidly grow and collapse under excitation of the low-frequency ultrasonic vibrator to generate the shock wave and the micro-jet; and cleaning an interior of the bushing gap of the small head hole of the connecting rod.

Preferably, the cleaning method for the bushing gap of the connecting rod further comprises: shooting the bushing gap through the infrared high-speed camera, judging whether the statistical result of the coordinates of the center of the ellipse in the picture treatment result satisfies the preset uniformity, and when the statistical result does not satisfy the preset uniformity, adjusting positions of optical elements in the second lens assembly to shoot again.

Compared with the prior art, the present invention has the following beneficial effects:

1. In the present invention, an ultrasonic-assisted laser-induced cavitation technology is used, which can effectively reduce the ultrasonic power and laser power needed by a cavitation threshold, thus significantly reducing energy consumption;
2. in the present invention, low-power ultrasonic wave and laser light are used, which can avoid a workpiece from being damaged by excessive energy, especially damage to the inner surfaces of big and small head holes of the connecting rod;
3. in the present invention, an ultrasonic-assisted laser-induced cavitation cleaning device automatically cleans the bolt hole and the bushing gap, and may replace manual cleaning by a worker who holds a high-pressure water jet spray gun in a cleaning room, to keep the worker away from a harsh machining environment, thus protecting the health of the worker, responding to the concepts of green production and green cleaning, and greatly improving production efficiency at the same time;
3. the device of the present invention is simple and clear in design, easy to disassemble and convenient to maintain, and convenient to maintain, and transmission and transportation assemblies of the device are mature industrial machinery products, which are universal and easy to purchase and maintain;
4. specific light paths and control methods designed by the present invention solve problems of discontinuity and low efficiency of point-to-point micro-local cleaning in the application of a laser-induced cavitation bubble technology in the field of cleaning, realize continuous cleaning in a vast area, and improve a cleaning efficiency; and
5. in the present invention, the infrared high-speed camera is used to shoot a focal point position for calculation feedback, to automatically control adjustment of the light paths, and avoid a possible problem of non-uniform cleaning of point-to-point induced cavitation bubbles.

Figure 1:
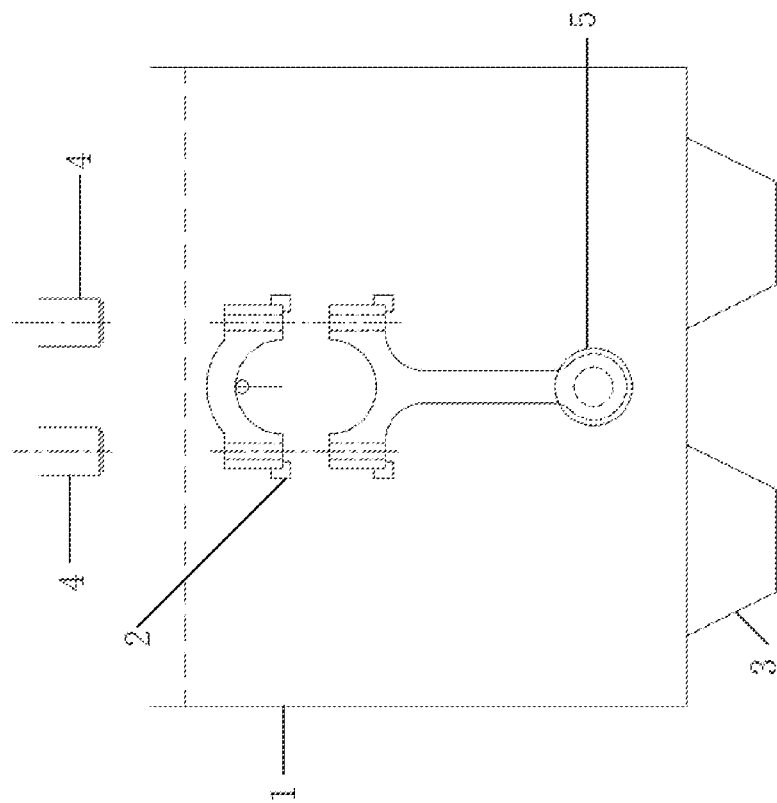
FIG. 1 is a perspective view of a front view of a laser cavitation composite ultrasonic cleaning device for a connecting rod according to one embodiment of the present invention.
Figure 2:
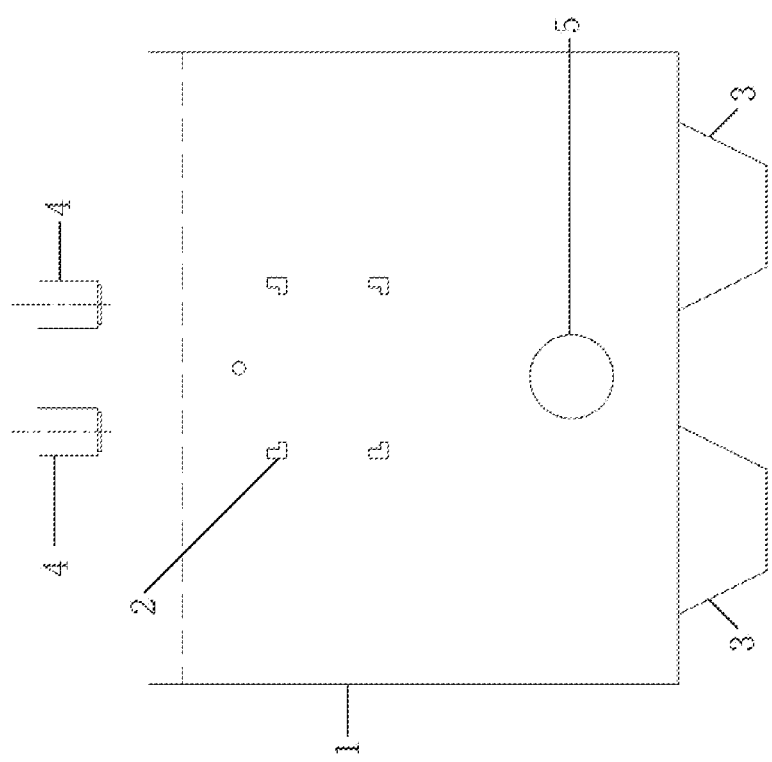
FIG. 2 is a perspective view of a front view of the laser cavitation composite ultrasonic cleaning device for the connecting rod according to one embodiment of the present invention, wherein a connecting rod to be cleaned is placed on a bracket.
Figure 3:
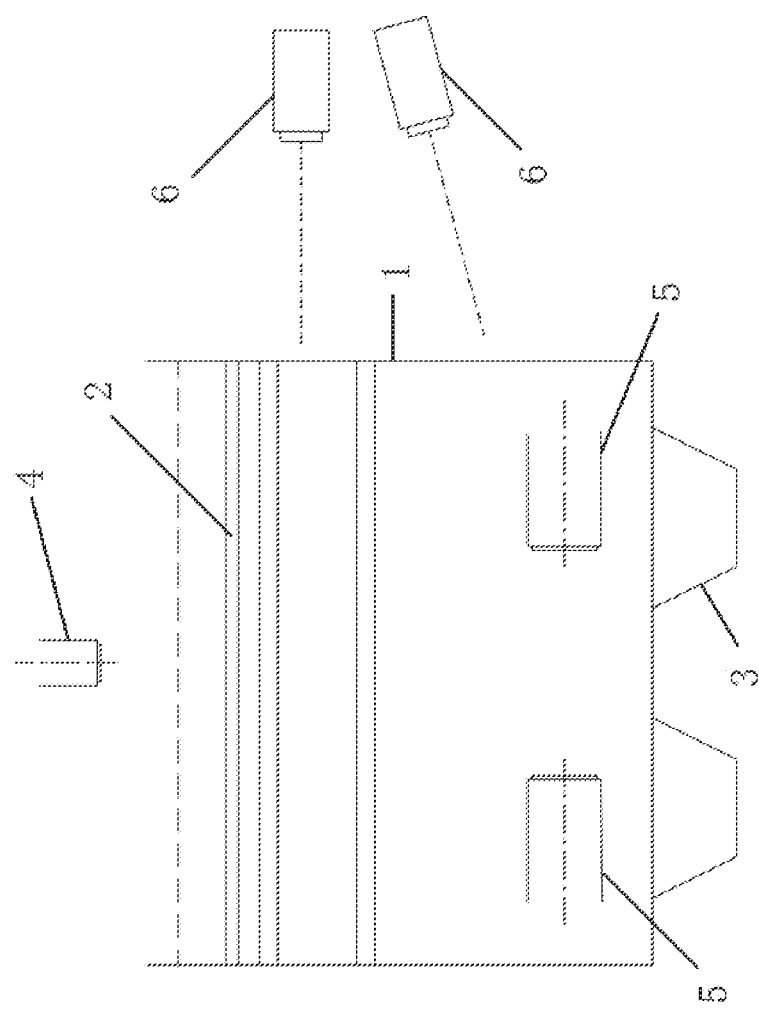
FIG. 3 is a perspective view of a side view of the laser cavitation composite ultrasonic cleaning device for the connecting rod according to one embodiment of the present invention.
Figure 4:
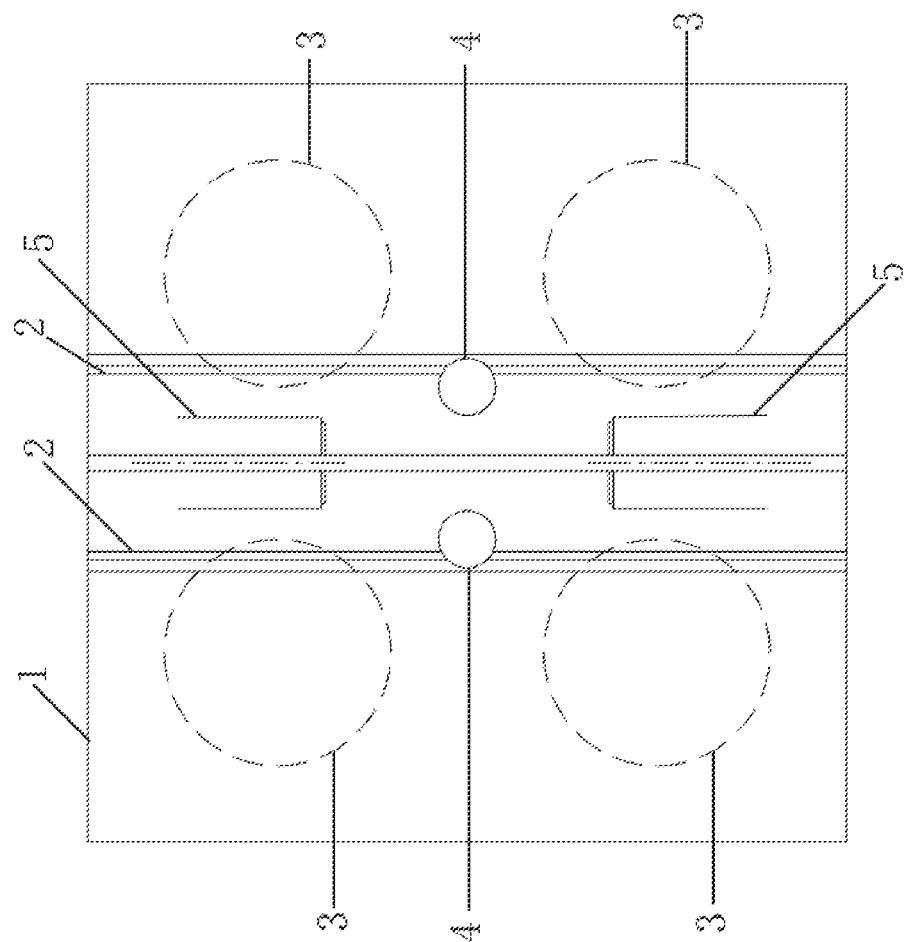
FIG. 4 is a perspective view of a top view of the laser cavitation composite ultrasonic cleaning device for the connecting rod according to one embodiment of the present invention.
Figure 5:
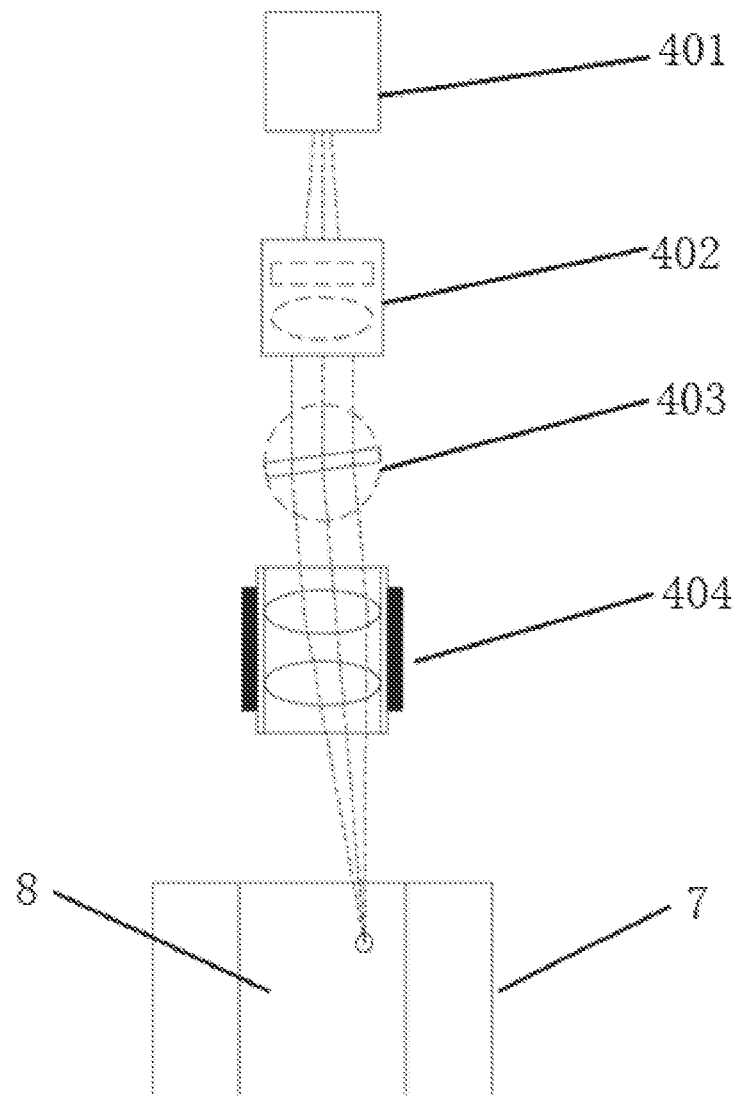
FIG. 5 is a schematic diagram of light paths of a first laser head according to one embodiment of the present invention.
Figure 6:
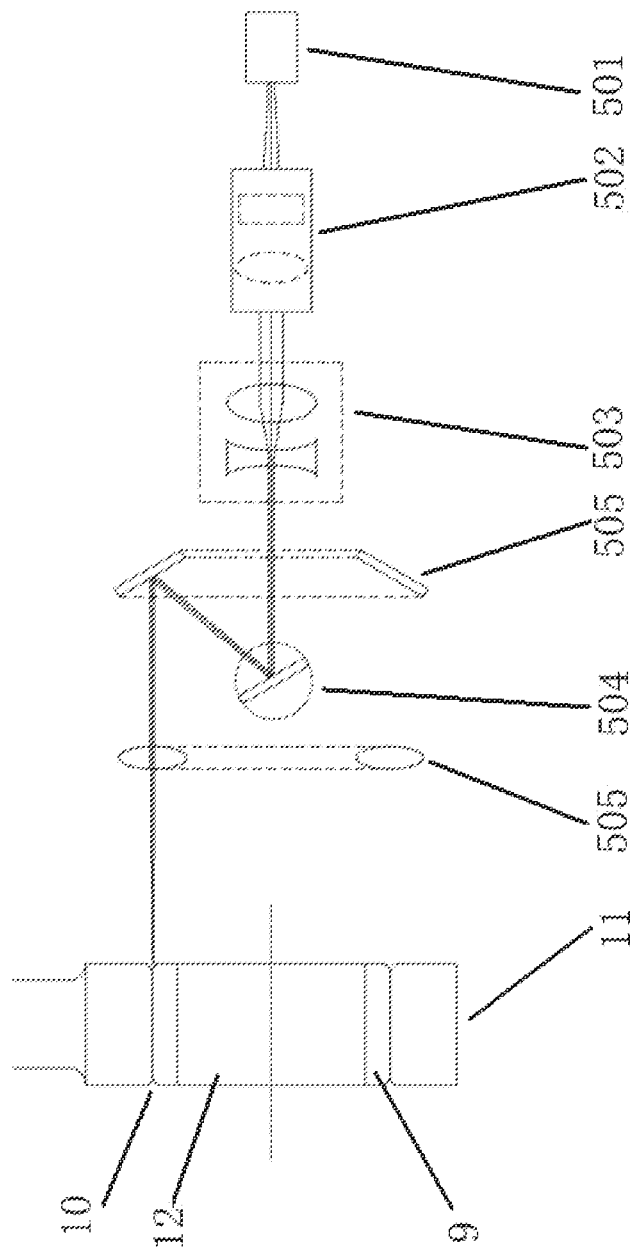
FIG. 6 is a schematic diagram of light paths of a second laser head according to one embodiment of the present invention.
Figure 8:
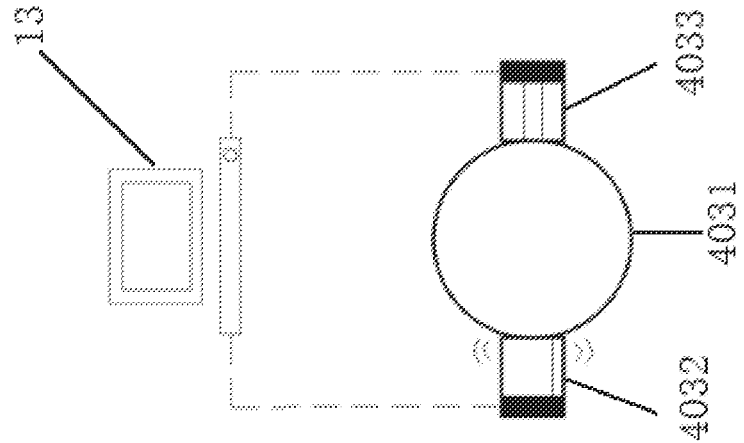
FIG. 8 is a top view of a control principle diagram of the x-y galvanometer set according to one embodiment of the present invention.
Figure 7:
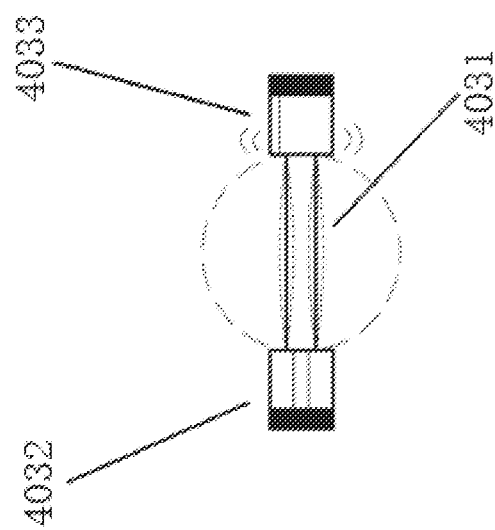
FIG. 7 is a front view of a schematic structural diagram of an x-y galvanometer set according to one embodiment of the present invention.
Figure 9:
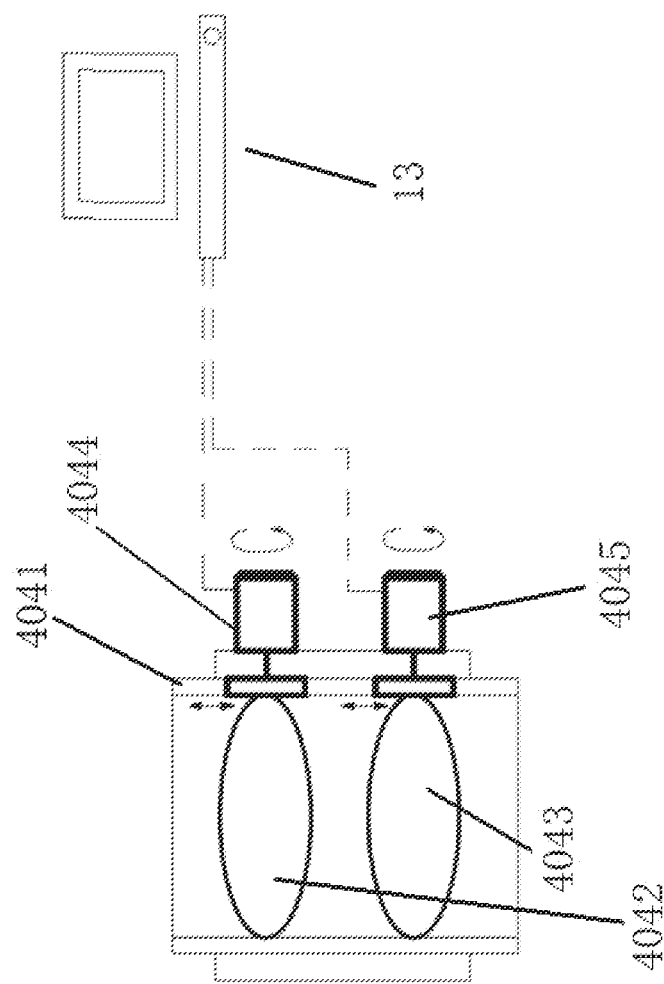
FIG. 9 is a control principle diagram of a first focusing lens set according to one embodiment of the present invention.
Figure 10:
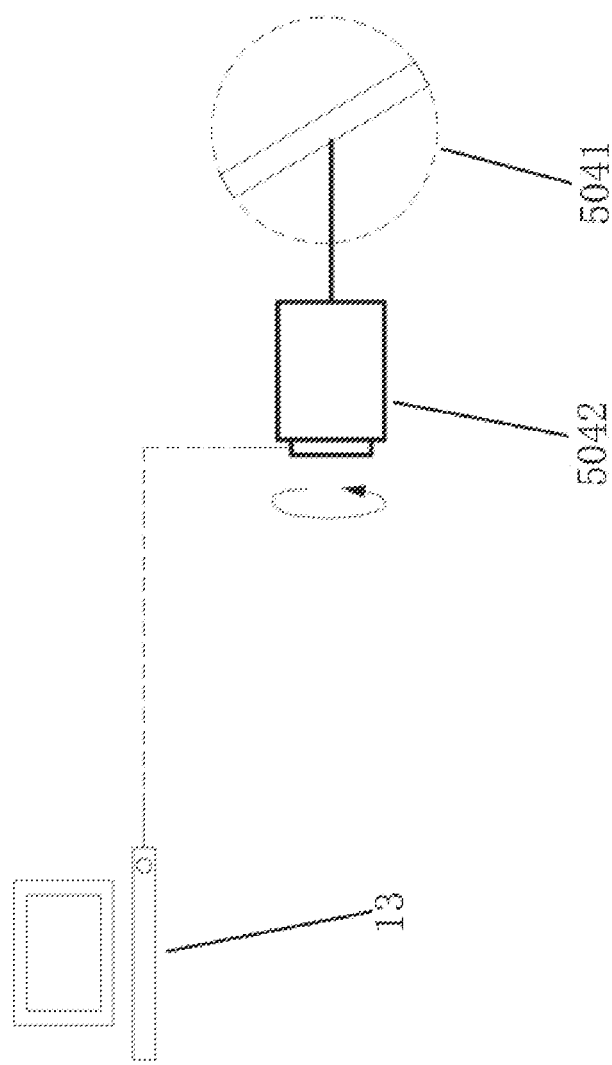
FIG. 10 is a control principle diagram of a reflecting galvanometer set according to one embodiment of the present invention.
Figure 11:
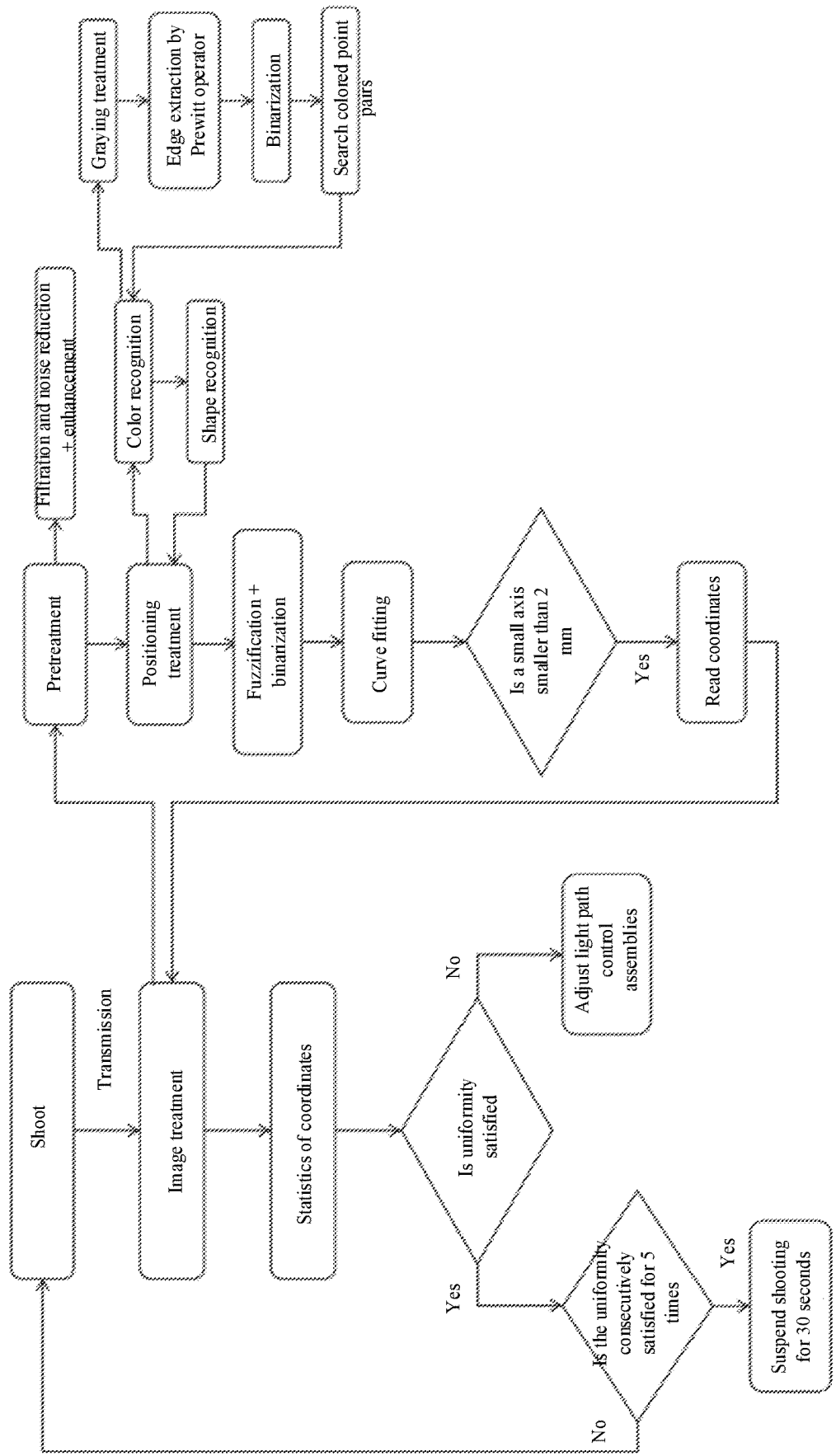
FIG. 11 is a flow chart of a shooting treatment and a feedback process of an infrared high-speed camera according to one embodiment of the present invention.

In the drawings, 1 refers to cleaning tank, 2 refers to bracket, 3 refers to low-frequency ultrasonic vibrator, 4 refers to first laser head, 5 refers to second laser head, 6 refers to infrared high-speed camera, 7 refers to connecting rod, 8 refers to bolt hole, 9 refers to bushing, 10 refers to bushing gap, 11 refers to small head hole end, 12 refers to inner surface of small head hole, 13 refers to upper computer, 401 refers to first laser, 402 refers to first beam expanding and collimating lens set, 403 refers to x-y galvanometer set, 404 refers to first focusing lens set, 501 refers to second laser, 502 refers to second beam expanding and collimating lens set, 503 refers to focusing and collimating lens set, 504 refers to reflecting galvanometer set, 505 refers to completely reflecting lens, 506 refers to second focusing lens, 4031 refers to first galvanometer lens, 4032 refers to x-vibration motor, 4033 refers to y-vibration motor, 4041 refers to guide rail, 4042 refers to third focusing lens, 4043 refers to fourth focusing lens, 4044 refers to first servo motor, 4045 refers to second servo motor, 5041 refers to second galvanometer lens, and 5042 refers to third servo motor.

DETAILED DESCRIPTION

The specific embodiments of the present invention are described in detail hereinafter with reference to the drawings.

The present invention provides a laser cavitation composite ultrasonic cleaning device for a connecting rod, used for cleaning a bolt hole 8 and a bushing gap 10 of the connecting rod, comprising a cleaning tank 1, a bracket 2, a low-frequency ultrasonic vibrator 3, a first laser head 4 and a second laser head 5; wherein:
bracket 2 is arranged in the middle of the cleaning tank 1; the low-frequency ultrasonic vibrator 3 is located on the outer side of the bottom portion of cleaning tank 1; during cleaning, the connecting rod 7 is vertically fixed on the bracket in the cleaning tank 1; and the low-frequency ultrasonic vibrator 3 is connected with an upper computer 13, and controlled by the upper computer 13;
the first laser head 4 is located above the bracket, with a light emitting direction vertical to a horizontal plane; and the second laser head is located at a lower portion in the cleaning tank, with a light emitting direction parallel to the horizontal plane;
the first laser head 4 comprises a first laser 401 and a first lens assembly, and the first lens assembly is arranged at a front end of a light emitting direction of the first laser 401;
the second laser head 5 comprises a second laser 501 and a second lens assembly, and the second lens assembly is arranged at a front end of a light emitting direction of the second laser 501;
the first laser head 4 is capable of focusing laser light in the bolt hole 8; and
the second laser head 5 is capable of focusing the laser light in the bushing gap 10.

According to a specific implementing solution of the present invention, the first lens assembly comprises a first beam expanding and collimating lens set 402, an x-y galvanometer set 403 and a first focusing lens set 404, and the first beam expanding and collimating lens set 402, the x-y galvanometer set 403 and the first focusing lens set 404 are sequentially arranged along the light emitting direction of the first laser 401. The x-y galvanometer set 403 and the first focusing lens set 404 are both connected with the upper computer 13 and controlled by the upper computer 13.

According to a specific implementing solution of the present invention, the first laser 4 and the second laser 5 are YAG lasers, and other lasers emitting pulsed laser light may also be used.

According to a specific implementing solution of the present invention, the x-y galvanometer set 403 comprises a first galvanometer lens 4031, an x-vibration motor 4032 and a y-vibration motor 4033, and the x-vibration motor 4032 and the y-vibration motor 4033 respectively control the vibration of the first galvanometer lens 4031 in an x direction and a y direction, so that a focal point of the laser light is capable of moving in an x-y plane, and the x-y plane is the horizontal plane. Vibration frequencies of the x-vibration motor 4032 and the y-vibration motor 4033 are the same as a laser pulse frequency, and vibration amplitudes of the x-vibration motor and the y-vibration motor are controlled by the upper computer to generate random values.

According to a specific implementing solution of the present invention, the first focusing lens set 404 comprises a guide rail 4041, a third focusing lens 4042, a fourth focusing lens 4043, a first servo motor 4044, and a second servo motor 4045. The third focusing lens 4042 and the fourth focusing lens 4043 are connected with the guide rail 4041 through a slider, and are capable of moving along an extension direction of the guide rail 4041, the first servo motor 4044 and the second servo motor 4045 are respectively connected with the third focusing lens 4042 and the fourth focusing lens 4043, and the first servo motor 4044 and the second servo motor 4045 are both controlled by the upper computer. Rotation frequencies of the first servo motor 4044 and the second servo motor 4045 are the same as the laser pulse frequency, and initial rotation angles of the first servo motor 4044 and the second servo motor 4045 are randomly generated by the upper computer. The upper computer outputs a certain pulse to control the first servo motor 4044 and the second servo motor 4045 to rotate in opposite directions by the same angle, which is converted into controlling a distance between the third focusing lens 4042 and the fourth focusing lens 4043 through the guide rail 4041, thus changing a z-direction (which is namely a vertical direction) movement in the bolt hole 8 of the focal point.

According to a specific implementing solution of the present invention, the second lens set comprises a second beam expanding and collimating lens set 502, a focusing and collimating lens set 503, a reflecting galvanometer set 504, a completely reflecting lens 505, and a second focusing lens 506. The second beam expanding and collimating lens set 502, the focusing and collimating lens set 503, the reflecting galvanometer set 504, the completely reflecting lens 505, and the second focusing lens 506 are sequentially arranged along the light emitting direction of the second laser. The reflecting galvanometer set 504 is connected with the upper computer 13, and controlled by the upper computer 13.

According to a specific implementing solution of the present invention, the completely reflecting lens 505 is an annular completely reflecting lens, and the second focusing lens 506 is an annular focusing lens.

According to a specific implementing solution of the present invention, the reflecting galvanometer set 504 comprises a second galvanometer lens 5041 and a third servo motor 5042, the second galvanometer lens 5041 is connected with the third servo motor 5042, the second galvanometer lens 5041 is parallel to the completely reflecting lens 505, and the third servo motor 5042 is controlled by the upper computer. A rotation frequency of the third servo motor 5042 is the same as the laser pulse frequency, and an initial rotation angle of the third servo motor 5042 is generated by the upper computer.

According to a specific implementing solution of the present invention, the initial rotation angle $\theta$ of the third servo motor 5042 satisfies all the following conditions:

$\theta$ is incapable of being evenly divided by 360;

$\theta$ is no less than $(360*d)/(2\pi r)$;

a minimum common factor of $\theta$ and 360 is no greater than n; which means that the laser light may be emitted to a dot that is dotted for the first time within n turns to complete one cleaning cycle, wherein selections of d and n are related to a material and a size of the connecting rod, and generally speaking, the larger the size of the connecting rod is, the larger the initial d value of the connecting rod is, and the larger the n is. The greater the strength of the material is, the smaller the initial d value is, and the smaller the n is. Moreover, the detection result of the infrared high-speed camera is adjusted during cleaning;

wherein, r is a circumferential radius of the bushing gap, in a unit of mm;

d is a distance between focal points of two adjacent pulse laser lights forming cavitation bubbles, in a unit of mm; the focal point of the laser light emitted for the first time may be randomly focused at any point in a circumference of the gap, a certain point may also be defined as an initial point, and a first focal point emitting position is reset to zero first when the cleaning is started each time;

n is a number of turns of the focal point of the laser light along the circumference of the bushing gap from a start to a dot that is dotted for the first time.

According to a specific implementing solution of the present invention, the laser cavitation composite ultrasonic cleaning device for the connecting rod further comprises two infrared high-speed cameras 6, wherein the two infrared high-speed cameras 6 are both connected with the upper computer, the two infrared high-speed cameras 6 respectively aim at the bolt hole 8 and the bushing gap 10 for shooting, and a shooting treatment and a feedback process of any infrared high-speed camera 6 are as follows.

A picture shot by the infrared high-speed camera 6 is transmitted to the upper computer, and the picture is pretreated.

A light spot of the focal point is preliminarily positioned.

Curve fitting is carried out on an edge of the light spot by a fuzzification treatment and a binarization treatment to obtain a regular ellipse.

When a short axis of the ellipse is less than a preset length, coordinates of the center of the ellipse are read, otherwise, the coordinates are not read. The growth and collapse of the cavitation bubbles are continuous processes, the shooting by the infrared high-speed camera 6 is a transient process, and the infrared high-speed camera is set to shoot and read the coordinates of the center of the ellipse before the bubbles grow to a preset length of the diameter. When the bubble grows to the preset length, the coordinates of the center of the ellipse are no longer read, thus reducing the treatment time and a statistical time of the coordinates of the center of the ellipse by the upper computer. The present length is preferably 2 mm.

A statistical treatment is carried out on coordinates of centers of all ellipses to judge whether a preset uniformity is satisfied; when the preset uniformity is not satisfied, positions of light path assemblies are adjusted; and when the preset uniformity is satisfied, whether a preset number of times is continuously satisfied is judged; when the preset number of times is continuously satisfied, the shooting is suspended for a predetermined time, and when the preset number of times is not continuously satisfied, the shooting is continued.

Positions of the cavitation bubbles in the bolt hole and bushing gap to be cleaned are shot by the infrared high-speed camera, to detect the positions of focal points, and whether the placement of the focal point of the laser light in the light path conforms to actual randomness is detected macrostatistically, which is namely the preset uniformity. When the placement does not conform to the actual randomness, relevant control assemblies are adjusted. The x-y galvanometer set 403 and the first focusing lens set 404 are adjusted through the light path of the cleaning laser head of the bolt hole; and the reflecting galvanometer set 504 is adjusted through the light path of the cleaning laser head of the bushing gap of the head hole, to solve the uniformity problem of the focal point needing to be concerned in point-to-point micro-local cleaning by the pulsed laser light.

The infrared high-speed camera plays a role in detecting the whole cleaning device. The laser cavitation composite ultrasonic cleaning device for the connecting rod can also realize the cleaning without the infrared high-speed camera, but cannot carry out the feedback process so the whole cleaning process is uncontrollable.

The frame rate of the shooting of the high-speed infrared camera is more than 250 frames per second, and pictures with an exposure of less than $\frac{1}{1000}^{th}$ of a second are shot for 3 seconds as a group. The images are packaged and transmitted to the upper computer for treatment and judged and fed back to the light path control assemblies, and the positions of the lenses are adjusted to adjust the position of the focal point. The next group of pictures is shot continuously 1 second later until all images shot in five consecutive groups of pictures conform to the preset uniformity after satisfying the position statistics of the focal point, then the shooting is suspended for a preset time (such as 30 seconds), and the shooting is continued again after the preset time; and when the images do not conform to the preset uniformity, the shooting is continued.

Since there are a large number of pictures to be treated, but there is a short treatment time required, it is only necessary to record the position of the focal point of the laser light at the moment when the laser light is emitted into the cleaning solution, and then energy for inducing the generation of the cavitation bubbles may be lower than energy for focusing the focal point and an infrared spot formed is larger, so that only the infrared spot formed by the focal point with a light spot smaller than a preset length (preset length <2 mm) is kept, and the infrared spot of the bubble larger than the preset length is filtered out, and then coordinates of a center of the light spot are read and transmitted to a background for statistics.

According to a specific implementing solution of the present invention, the preliminary positioning of the light spot of the focal point comprises color recognition and shape recognition, and specifically comprises the following steps:

carrying out a graying treatment on the picture, carrying out edge extraction by using a Prewitt operator, and then carrying out a binarization treatment to determine a search range of colored point pairs;

searching the colored point pairs; and carrying out the shape recognition to highlight the position of the light spot, and carrying out several morphological closing operations and erosion operations on the image to preliminarily determine the position of the light spot.

According to a specific implementing solution of the present invention, the pre-treating comprises filtration, noise reduction, and enhancement of the picture.

The present invention provides a laser cavitation composite ultrasonic cleaning method for a connecting rod, wherein the method uses any laser cavitation composite ultrasonic cleaning device for the connecting rod above, and comprises a cleaning method for a bolt hole of the connecting rod, which specifically comprises the following steps of:

emitting pulsed laser light by a first laser 401, wherein the pulsed laser light passes through a first lens assembly and then is focused in a cleaning solution in the bolt hole 8;

exciting cavitation by the laser light to generate a microbubble nucleus in the cleaning solution;

allowing the bubble nucleus to rapidly grow and collapse under excitation of the low-frequency ultrasonic vibrator 3 to generate the shock wave and the micro-jet; and cleaning an internal thread surface of bolt hole 8 by the micro-jet.

According to a specific implementing solution of the present invention, the cleaning method for the bolt hole of the connecting rod further comprises: shooting the bolt hole 8 through the infrared high-speed camera 6, judging whether a statistical result of coordinates of a center of an ellipse in a picture treatment result satisfies a preset uniformity, and when the statistical result does not satisfy the preset uniformity, adjusting positions of optical elements in the first lens assembly to shoot again.

The present invention provides a laser cavitation composite ultrasonic cleaning method for a connecting rod, wherein the method uses any laser cavitation composite ultrasonic cleaning device for the connecting rod above, and comprises a cleaning method for a bushing gap of the connecting rod, which specifically comprises the following steps of:

emitting pulsed laser light by a second laser 501, wherein the pulsed laser light passes through a second lens assembly and then is focused in a cleaning solution inside the bushing gap 10 of a small head hole of the connecting rod;

exciting cavitation by the laser light to generate a microbubble nucleus in the cleaning solution;

allowing the bubble nucleus to rapidly grow and collapse under excitation of the low-frequency ultrasonic vibrator 3 to generate the shock wave and the micro-jet; and cleaning an interior of the bushing gap 10 of the small head hole of the connecting rod.

According to a specific implementing solution of the present invention, the cleaning method for the bushing gap of the connecting rod further comprises: shooting the bushing gap through the infrared high-speed camera 6, judging whether the statistical result of the coordinates of the center of the ellipse in the picture treatment result satisfies the preset uniformity, and when the statistical result does not satisfy the preset uniformity, adjusting positions of optical elements in the second lens assembly to shoot again.

Embodiment 1

According to a specific implementing solution of the present invention, a laser cavitation composite ultrasonic cleaning device for a connecting rod of the present invention is described in detail hereinafter.

The present invention provides a laser cavitation composite ultrasonic cleaning device for a connecting rod, used for cleaning a bolt hole 8 and a bushing gap 10 of the connecting rod, comprising a cleaning tank 1, a bracket 2, a low-frequency ultrasonic vibrator 3, a first laser head 4 and a second laser head 5; wherein:

bracket 2 is arranged in the middle of the cleaning tank 1; the low-frequency ultrasonic vibrator 3 is located on the outer side of the bottom portion of cleaning tank 1; during cleaning, the connecting rod 7 is vertically fixed on the bracket in the cleaning tank 1; and the low-frequency ultrasonic vibrator 3 is connected with an upper computer 13, and controlled by the upper computer 13;

the first laser head 4 is located above the bracket, with a light emitting direction vertical to a horizontal plane; and the second laser head is located at a lower portion in the cleaning tank, with a light emitting direction parallel to the horizontal plane;

the first laser head 4 comprises a first laser 401 and a first lens assembly, and the first lens assembly is arranged at a front end of a light emitting direction of the first laser 401;

the second laser head 5 comprises a second laser 501 and a second lens assembly, and the second lens assembly is arranged at a front end of a light emitting direction of the second laser 501;

the first laser head 4 is capable of focusing laser light in the bolt hole 8; and the second laser head 5 is capable of focusing the laser light in the bushing gap 10.

Embodiment 2

According to a specific implementing solution of the present invention, a laser cavitation composite ultrasonic cleaning device for a connecting rod of the present invention is described in detail hereinafter.

The present invention provides a laser cavitation composite ultrasonic cleaning device for a connecting rod, used for cleaning a bolt hole 8 and a bushing gap 10 of the connecting rod, comprising a cleaning tank 1, a bracket 2, a low-frequency ultrasonic vibrator 3, a first laser head 4 and a second laser head 5; wherein:

bracket 2 is arranged in the middle of the cleaning tank 1; the low-frequency ultrasonic vibrator 3 is located on the outer side of the bottom portion of cleaning tank 1; during cleaning, the connecting rod 7 is vertically fixed on the bracket in the cleaning tank 1; and the low-frequency ultrasonic vibrator 3 is connected with an upper computer 13, and controlled by the upper computer 13;

the first laser head 4 is located above the bracket, with a light emitting direction vertical to a horizontal plane; and the second laser head is located at a lower portion in the cleaning tank, with a light emitting direction parallel to the horizontal plane;

the first laser head 4 comprises a first laser 401 and a first lens assembly, and the first lens assembly is arranged at a front end of a light emitting direction of the first laser 401;

the second laser head 5 comprises a second laser 501 and a second lens assembly, and the second lens assembly is arranged at a front end of a light emitting direction of the second laser 501;

the first laser head 4 is capable of focusing laser light in the bolt hole 8; and the second laser head 5 is capable of focusing the laser light in the bushing gap 10.

The first lens assembly comprises a first beam expanding and collimating lens set 402, an x-y galvanometer set 403 and a first focusing lens set 404, and the first beam expanding and collimating lens set 402, the x-y galvanometer set 403 and the first focusing lens set 404 are sequentially arranged along the light emitting direction of the first laser 401. The x-y galvanometer set 403 and the first focusing lens set 404 are both connected with the upper computer 13 and controlled by the upper computer 13.

The second lens set comprises a second beam expanding and collimating lens set 502, a focusing and collimating lens set 503, a reflecting galvanometer set 504, a completely reflecting lens 505, and a second focusing lens 506. The second beam expanding and collimating lens set 502, the focusing and collimating lens set 503, the reflecting galvanometer set 504, the completely reflecting lens 505, and the second focusing lens 506 are sequentially arranged along the light emitting direction of the second laser. The reflecting galvanometer set 504 is connected with the upper computer 13, and controlled by the upper computer 13.

Embodiment 3

According to a specific implementing solution of the present invention, a laser cavitation composite ultrasonic cleaning device for a connecting rod of the present invention is described in detail hereinafter.

The present invention provides a laser cavitation composite ultrasonic cleaning device for a connecting rod, used for cleaning a bolt hole 8 and a bushing gap 10 of the connecting rod, comprising a cleaning tank 1, a bracket 2, a low-frequency ultrasonic vibrator 3, a first laser head 4 and a second laser head 5; wherein:

bracket 2 is arranged in the middle of the cleaning tank 1; the low-frequency ultrasonic vibrator 3 is located on the outer side of the bottom portion of the cleaning tank 1; during cleaning, the connecting rod 7 is vertically fixed on the bracket in the cleaning tank 1; and the low-frequency ultrasonic vibrator 3 is connected with an upper computer 13, and controlled by the upper computer 13;

the first laser head 4 is located above the bracket, with a light emitting direction vertical to a horizontal plane; and the second laser head is located at a lower portion in the cleaning tank, with a light emitting direction parallel to the horizontal plane;

the first laser head 4 comprises a first laser 401 and a first lens assembly, and the first lens assembly is arranged at a front end of a light emitting direction of the first laser 401;

the second laser head 5 comprises a second laser 501 and a second lens assembly, and the second lens assembly is arranged at a front end of a light emitting direction of the second laser 501;

the first laser head 4 is capable of focusing laser light in the bolt hole 8; and the second laser head 5 is capable of focusing the laser light in the bushing gap 10.

The first lens assembly comprises a first beam expanding and collimating lens set 402, an x-y galvanometer set 403 and a first focusing lens set 404, and the first beam expanding and collimating lens set 402, the x-y galvanometer set 403 and the first focusing lens set 404 are sequentially arranged along the light emitting direction of the first laser 401. The x-y galvanometer set 403 and the first focusing lens set 404 are both connected with the upper computer 13 and controlled by the upper computer 13.

The x-y galvanometer set 403 is composed of a first galvanometer lens 4031, an x-vibration motor 4032, and a y-vibration motor 4033, and the x-vibration motor 4032 and the y-vibration motor 4033 respectively control the vibration of the first galvanometer lens 4031 in an x direction and a y direction so that a focal point of the laser light is capable of moving in an x-y plane, and the x-y plane is the horizontal plane.

The first focusing lens set 404 comprises a guide rail 4041, a third focusing lens 4042, a fourth focusing lens 4043, a first servo motor 4044, and a second servo motor 4045. The third focusing lens 4042 and the fourth focusing lens 4043 are connected with the guide rail 4041 through a slider, and are capable of moving along an extension direction of the guide rail 4041, the first servo motor 4044 and the second servo motor 4045 are respectively connected with the third focusing lens 4042 and the fourth focusing lens 4043, and the first servo motor 4044 and the second servo motor 4045 are both controlled by the upper computer. Rotation frequencies of the first servo motor 4044 and the second servo motor 4045 are the same as the laser pulse frequency, and initial rotation angles of the first servo motor 4044 and the second servo motor 4045 are randomly generated by the upper computer. The upper computer outputs a certain pulse to control the first servo motor 4044 and the second servo motor 4045 to rotate in opposite directions by the same angle, which is converted into controlling a distance between the third focusing lens 4042 and the fourth focusing lens 4043 through the guide rail 4041, thus changing a z-direction (which is namely a vertical direction) movement in the bolt hole 8 of the focal point.

The second lens set comprises a second beam expanding and collimating lens set 502, a focusing and collimating lens set 503, a reflecting galvanometer set 504, a completely reflecting lens 505, and a second focusing lens 506. The second beam expanding and collimating lens set 502, the focusing and collimating lens set 503, the reflecting galvanometer set 504, the completely reflecting lens 505, and the second focusing lens 506 are sequentially arranged along the light emitting direction of the second laser. The reflecting galvanometer set 504 is connected with the upper computer 13, and controlled by the upper computer 13.

The reflecting galvanometer set 504 comprises a second galvanometer lens 5041 and a third servo motor 5042, the second galvanometer lens is connected with the third servo motor, the second galvanometer lens 5041 is parallel to the completely reflecting lens 505, and the third servo motor 5042 is controlled by the upper computer. A rotation frequency of the third servo motor 5042 is the same as the laser pulse frequency, and an initial rotation angle of the third servo motor 5042 is generated by the upper computer.

The initial rotation angle θ of the third servo motor 5042 satisfies all the following conditions:

θ is incapable of being evenly divided by 360;

θ is no less than $(360*d)/(2\pi r)$;

a minimum common factor of θ and 360 is no greater than n;

wherein, r is a circumferential radius of the bushing gap, in a unit of mm;

d is a distance between focal points of two adjacent pulse laser lights forming cavitation bubbles, in a unit of mm; and n is a number of turns of the focal point of the laser light along the circumference of the bushing gap from a start to a dot that is dotted for the first time.

The laser cavitation composite ultrasonic cleaning device for the connecting rod further comprises two infrared high-speed cameras 6, wherein the two infrared high-speed cameras 6 are both connected with the upper computer, the two infrared high-speed cameras 6 respectively aim at the bolt hole 8 and the bushing gap 10 for shooting, and a shooting treatment and a feedback process of any infrared high-speed camera 6 are as follows.

A picture shot by the infrared high-speed camera 6 is transmitted to the upper computer, and the picture is pre-treated.

A light spot of the focal point is preliminarily positioned.

Curve fitting is carried out on an edge of the light spot by a fuzzification treatment and a binarization treatment to obtain a regular ellipse.

When a short axis of the ellipse is less than a preset length, coordinates of the center of the ellipse are read, otherwise, the coordinates are not read. The growth and collapse of the cavitation bubbles are continuous processes, the shooting by the infrared high-speed camera 6 is a transient process, and the infrared high-speed camera is set to shoot and read the coordinates of the center of the ellipse before the bubbles grow to a preset length of the diameter. When the bubble grows to the preset length, the coordinates of the center of the ellipse are no longer read, thus reducing the treatment time and a statistical time of the coordinates of the center of the ellipse by the upper computer. The present length is preferably 2 mm.

A statistical treatment is carried out on coordinates of centers of all ellipses to judge whether a preset uniformity is satisfied; when the preset uniformity is not satisfied, positions of light path assemblies are adjusted; and when the preset uniformity is satisfied, whether a preset number of times is continuously satisfied is judged; when the preset number of times is continuously satisfied, the shooting is suspended for a predetermined time, and when the preset number of times is not continuously satisfied, the shooting is continued.

The preliminary positioning of the light spot of the focal point comprises color recognition and shape recognition, and specifically comprises the following steps:

carrying out a graying treatment on the picture, carrying out edge extraction by using a Prewitt operator, and then carrying out a binarization treatment to determine a search range of colored point pairs;

searching the colored point pairs; and carrying out the shape recognition to highlight the position of the light spot, and carrying out several morphological closing operations and erosion operations on the image to preliminarily determine the position of the light spot.

The pre-treating comprises filtration, noise reduction, and enhancement of the picture.

Embodiment 4

According to a specific implementing solution of the present invention, a laser cavitation composite ultrasonic cleaning device for a connecting rod of the present invention is described in detail hereinafter.

The present invention provides a laser cavitation composite ultrasonic cleaning device for a connecting rod, used for cleaning a bolt hole 8 and a bushing gap 10 of the connecting rod, comprising a cleaning tank 1, a bracket 2, a low-frequency ultrasonic vibrator 3, a first laser head 4 and a second laser head 5; wherein the first laser 4 and the second laser 5 are YAG lasers;

bracket 2 is arranged in the middle of the cleaning tank 1; the low-frequency ultrasonic vibrator 3 is located on the outer side of the bottom portion of cleaning tank 1; during cleaning, the connecting rod 7 is vertically fixed on the bracket in the cleaning tank 1; and the low-frequency ultrasonic vibrator 3 is connected with an upper computer 13, and controlled by the upper computer 13;

the first laser head 4 is located above the bracket, with a light emitting direction vertical to a horizontal plane; and the second laser head is located at a lower portion in the cleaning tank, with a light emitting direction parallel to the horizontal plane;

the first laser head 4 comprises a first laser 401 and a first lens assembly, and the first lens assembly is arranged at a front end of a light emitting direction of the first laser 401;

the second laser head 5 comprises a second laser 501 and a second lens assembly, and the second lens assembly is arranged at a front end of a light emitting direction of the second laser 501;

the first laser head 4 is capable of focusing laser light in the bolt hole 8; and the second laser head 5 is capable of focusing the laser light in the bushing gap 10.

The first lens assembly comprises a first beam expanding and collimating lens set 402, an x-y galvanometer set 403 and a first focusing lens set 404, and the first beam expanding and collimating lens set 402, the x-y galvanometer set 403 and the first focusing lens set 404 are sequentially arranged along the light emitting direction of the first laser 401. The x-y galvanometer set 403 and the first focusing lens set 404 are both connected with the upper computer 13 and controlled by the upper computer 13.

The x-y galvanometer set 403 is composed of a first galvanometer lens 4031, an x-vibration motor 4032, and a y-vibration motor 4033, and the x-vibration motor 4032 and the y-vibration motor 4033 respectively control the vibration of the first galvanometer lens 4031 in an x direction and a y direction so that a focal point of the laser light is capable of moving in an x-y plane, and the x-y plane is the horizontal plane. Vibration frequencies of the x-vibration motor 4032 and the y-vibration motor 4033 are the same as a laser pulse frequency, and vibration amplitudes of the x-vibration motor and the y-vibration motor are controlled by the upper computer to generate random values.

The first focusing lens set 404 comprises a guide rail 4041, a third focusing lens 4042, a fourth focusing lens 4043, a first servo motor 4044, and a second servo motor 4045. The third focusing lens 4042 and the fourth focusing lens 4043 are connected with the guide rail 4041 through a slider, and are capable of moving along an extension direction of the guide rail 4041, the first servo motor 4044 and the second servo motor 4045 are respectively connected with the third focusing lens 4042 and the fourth focusing lens 4043, and the first servo motor 4044 and the second servo motor 4045 are both controlled by the upper computer. Rotation frequencies of the first servo motor 4044 and the second servo motor 4045 are the same as the laser pulse frequency, and initial rotation angles of the first servo motor 4044 and the second servo motor 4045 are randomly generated by the upper computer. The upper computer outputs a certain pulse to control the first servo motor 4044 and the second servo motor 4045 to rotate in opposite directions by the same angle, which is converted into controlling a distance between the third focusing lens 4042 and the fourth focusing lens 4043 through the guide rail 4041, thus changing a z-direction (which is namely a vertical direction) movement in the bolt hole 8 of the focal point.

The second lens set comprises a second beam expanding and collimating lens set 502, a focusing and collimating lens set 503, a reflecting galvanometer set 504, a completely reflecting lens 505, and a second focusing lens 506. The second beam expanding and collimating lens set 502, the focusing and collimating lens set 503, the reflecting galvanometer set 504, the completely reflecting lens 505, and the second focusing lens 506 are sequentially arranged along the light emitting direction of the second laser. The completely reflecting lens 505 is an annular completely reflecting lens, and the second focusing lens 506 is an annular focusing lens. The reflecting galvanometer set 504 is connected with the upper computer 13, and controlled by the upper computer 13.

The reflecting galvanometer set 504 comprises a second galvanometer lens 5041 and a third servo motor 5042, the second galvanometer lens is connected with the third servo motor, the second galvanometer lens 5041 is parallel to the completely reflecting lens 505, and the third servo motor 5042 is controlled by the upper computer. A rotation frequency of the third servo motor 5042 is the same as the laser pulse frequency, and an initial rotation angle of the third servo motor 5042 is generated by the upper computer.

The initial rotation angle $\theta$ of the third servo motor 5042 satisfies all the following conditions:

$\theta$ is incapable of being evenly divided by 360;

$\theta$ is no less than $(360*d)/(2\pi r)$;

a minimum common factor of $\theta$ and 360 is no greater than n;

wherein, r is a circumferential radius of the bushing gap, in a unit of mm;

d is a distance between focal points of two adjacent pulse laser lights forming cavitation bubbles, in a unit of mm; and n is a number of turns of the focal point of the laser light along the circumference of the bushing gap from a start to a dot that is dotted for the first time.

The laser cavitation composite ultrasonic cleaning device for the connecting rod further comprises two infrared high-speed cameras 6, wherein the two infrared high-speed cameras 6 are both connected with the upper computer, the two infrared high-speed cameras 6 respectively aim at the bolt hole 8 and the bushing gap 10 for shooting, and a shooting treatment and a feedback process of any infrared high-speed camera 6 are as follows.

A picture shot by the infrared high-speed camera 6 is transmitted to the upper computer, and the picture is pre-treated.

A light spot of the focal point is preliminarily positioned.

Curve fitting is carried out on an edge of the light spot by a fuzzification treatment and a binarization treatment to obtain a regular ellipse.

When a short axis of the ellipse is less than a preset length, coordinates of the center of the ellipse are read, otherwise, the coordinates are not read. The growth and collapse of the cavitation bubbles are continuous processes, the shooting by the infrared high-speed camera 6 is a transient process, and the infrared high-speed camera is set to shoot and read the coordinates of the center of the ellipse before the bubbles grow to a preset length of the diameter. When the bubble grows to the preset length, the coordinates of the center of the ellipse are no longer read, thus reducing the treatment time and a statistical time of the coordinates of the center of the ellipse by the upper computer.

A statistical treatment is carried out on coordinates of centers of all ellipses to judge whether a preset uniformity is satisfied; when the preset uniformity is not satisfied, positions of light path assemblies are adjusted; and when the preset uniformity is satisfied, whether a preset number of times is continuously satisfied is judged; when the preset number of times is continuously satisfied, the shooting is suspended for a predetermined time, and when the preset number of times is not continuously satisfied, the shooting is continued.

The preliminary positioning of the light spot of the focal point comprises color recognition and shape recognition, and specifically comprises the following steps:

carrying out a graying treatment on the picture, carrying out edge extraction by using a Prewitt operator, and then carrying out a binarization treatment to determine a search range of colored point pairs;

searching the colored point pairs; and carrying out the shape recognition to highlight the position of the light spot, and carrying out several morphological closing operations and erosion operations on the image to preliminarily determine the position of the light spot.

The pre-treating comprises filtration, noise reduction, and enhancement of the picture.

A specific working principle of the light path of the laser light for cleaning bolt hole 8 is as follows:

the first laser 401 emits the pulsed laser light, which passes through the first beam expanding and collimating lens set 402 to obtain a laser beam with a reduced emission angle, an enlarged waist radius, and a regular light spot;

then, the laser beam passes through the x-y galvanometer set 403 to control a focusing position of the laser light on the horizontal plane; and passes through the first focusing lens set 404 to control a vertical focusing position of the laser light; and finally, the laser light is focused on the cleaning solution in bolt hole 8 to excite cavitation to generate a microbubble nucleus, the bubble nucleus rapidly grows and collapses under excitation of a low-frequency ultrasonic wave to generate a shock wave and a microjet, to clean an internal thread surface of the bolt hole 8, thus removing residual metal particles and dirt on the surface.

A specific working principle of the light path of the laser light for cleaning the bushing gap 10 is as follows:

the second laser 501 emits the pulsed laser light, which passes through the second beam expanding and collimating lens set 502 to obtain a laser beam with a reduced emission angle, an enlarged waist radius, and a regular light spot;

then, the laser beam passes through the focusing and collimating lens set 503 to focus and collimate the laser beam, so that the energy of the laser beam is more concentrated and the diameter of the light spot is smaller, thus entering the gap better; and the focused high-density parallel laser light is reflected by the reflecting galvanometer set 504 and the annular completely reflecting lens 505 and focused by the annular focusing lens 506 in the cleaning solution inside the bushing gap 10 of the small head hole, to excite the generation of the microbubble nucleus, the bubble nucleus rapidly grows and collapses under the excitation of the low-frequency ultrasonic wave to generate the shock wave and the micro-jet, to clean an interior of the bushing gap 10, thus rinsing out residual metal particles and dirt hidden in the bushing gap.

Embodiment 5

According to a specific implementing solution of the present invention, a laser cavitation composite ultrasonic cleaning method for a connecting rod of the present invention is described in detail hereinafter.

The present invention provides a laser cavitation composite ultrasonic cleaning method for a connecting rod, wherein the method uses any laser cavitation composite ultrasonic cleaning device for the connecting rod above, and comprises a cleaning method for a bolt hole of the connecting rod, which specifically comprises the following steps of:

emitting pulsed laser light by a first laser 401, wherein the pulsed laser light passes through a first lens assembly and then is focused in a cleaning solution in the bolt hole 8;

exciting cavitation by the laser light to generate a microbubble nucleus in the cleaning solution;

allowing the bubble nucleus to rapidly grow and collapse under excitation of the low-frequency ultrasonic vibrator 3 to generate the shock wave and the micro-jet; and cleaning an internal thread surface of bolt hole 8 by the micro jet.

The cleaning method for the bolt hole of the connecting rod further comprises: shooting the bolt hole 8 through an infrared high-speed camera 6, judging whether a statistical result of coordinates of a center of an ellipse in a picture treatment result satisfies a preset uniformity, and when the statistical result does not satisfy the preset uniformity, adjusting positions of optical elements in the first lens assembly to shoot again.

A working principle and a control method of the light path of the laser light for cleaning bolt hole 8 are as follows:

the laser light is emitted into the cleaning solution by using a discontinuity of the pulsed laser light to instantly induce and excite a micro cavitation bubble nucleus, a focal point of the next pulsed laser light is changed to interrupt the energy of the laser light at the point, and the micro cavitation bubble nucleus is excited by directly using a low-frequency ultrasonic wave to promote rapid grow and collapse of the micro cavitation bubble nucleus, to generate a shock wave and a micro-jet, thus achieving the purpose of cleaning; and meanwhile, the pulsed laser light is continuously used elsewhere to induce the micro cavitation bubble nucleus, the micro cavitation bubble nucleus may be easily formed in the threaded hole due to a small volume, with little influence on other micro cavitation bubble nuclei just generated, and it is not easy to interrupt or destroy the growth and collapse of the other micro cavitation bubble nuclei so that a lot of cavitation bubbles are generated, and rapidly grow and collapse inside the bolt hole in a short time macroscopically, and a high-density cavitation effect can be achieved in this area, thus achieving a strong cleaning purpose and a high cleaning efficiency.

The present invention provides a laser cavitation composite ultrasonic cleaning method for a connecting rod, wherein the method uses any laser cavitation composite ultrasonic cleaning device for the connecting rod above, and comprises a cleaning method for a bushing gap of the connecting rod, which specifically comprises the following steps of:

emitting pulsed laser light by a second laser 501, wherein the pulsed laser light passes through a second lens assembly and then is focused in a cleaning solution inside the bushing gap 10 of a small head hole of the connecting rod;

exciting cavitation by the laser light to generate a microbubble nucleus in the cleaning solution;

allowing the bubble nucleus to rapidly grow and collapse under excitation of the low-frequency ultrasonic vibrator 3 to generate the shock wave and the micro-jet; and cleaning an interior of the bushing gap 10 of the small head hole of the connecting rod.

The cleaning method for the bushing gap of the connecting rod further comprises: shooting the bushing gap through the infrared high-speed camera 6, judging whether the statistical result of the coordinates of the center of the ellipse in the picture treatment result satisfies the preset uniformity, and when the statistical result does not satisfy the preset uniformity, adjusting positions of optical elements in the second lens assembly to shoot again.

A working principle and a control method of the light path of the laser light for cleaning the bushing gap 10 are as follows:

the laser light is emitted into the cleaning solution by using a discontinuity of the pulsed laser light to instantly induce and excite a micro cavitation bubble nucleus, a focal point of the next pulsed laser light is changed to interrupt the energy of the laser light at the point, and the micro cavitation bubble nucleus is excited by directly using a low-frequency ultrasonic wave to promote rapid grow and collapse of the micro cavitation bubble nucleus, to generate a shock wave and a micro-jet, thus achieving the purpose of cleaning; and meanwhile, the pulsed laser light is continuously used elsewhere on a circumference of the bushing gap 10 of the small hole to induce the micro cavitation bubble nucleus, since the micro cavitation bubble nucleus has a small volume, the laser light may enter the gap to form the bubble nucleus, which solves defects that the cavitation bubbles induced by the low-frequency ultrasonic wave are too large to enter the gap and the cavitation bubbles induced by the high-frequency ultrasonic wave are not easy to grow and collapse, with little influence on other micro cavitation bubble nuclei just generated, and it is not easy to interrupt or destroy the growth and collapse of the other micro cavitation bubble nuclei, so that a lot of cavitation bubbles are generated, and rapidly grow and collapse inside the bushing gap 10 of the small head hole in a short time macroscopically, and a high-density cavitation effect can be achieved in this area, thus achieving a strong cleaning purpose and a high cleaning efficiency.

The above is only the preferred embodiments of the present invention and is not intended to limit the present invention. For those skilled in the art, the present invention may have various modifications and changes. Any modification, equivalent substitution, and improvement made within the spirit and principle of the present invention are included in the scope of protection of the present invention.

The invention claimed is:

1. A laser cavitation composite ultrasonic cleaning device for a connecting rod, used for cleaning a bolt hole and a bushing gap of the connecting rod, comprising a cleaning tank, a bracket, a low-frequency ultrasonic vibrator, a first laser head, and a second laser head; wherein:
the bracket is arranged in the middle of the cleaning tank;
the low-frequency ultrasonic vibrator is located on the outer side of the bottom portion of the cleaning tank, and the low-frequency ultrasonic vibrator is connected to an upper computer, and controlled by the upper computer;
the first laser head is located above the bracket, with a light emitting direction vertical to a horizontal plane; and the second laser head is located at a lower portion in the cleaning tank, with a light emitting direction parallel to the horizontal plane;
the first laser head comprises a first laser and a first lens assembly, and the first lens assembly is arranged at a front end of a light emitting direction of the first laser;
the second laser head comprises a second laser and a second lens assembly, and the second lens assembly is arranged at a front end of a light emitting direction of the second laser;
the first laser head is capable of focusing laser light in the bolt hole; and
the second laser head is capable of focusing the laser light in the bushing gap.

2. The laser cavitation composite ultrasonic cleaning device for the connecting rod according to claim 1, wherein the first lens assembly comprises a first beam expanding and collimating lens set, an x-y galvanometer set, and a first focusing lens set, the first beam expanding and collimating lens set, the x-y galvanometer set, and the first focusing lens set are sequentially arranged along the light emitting direction of the first laser, and the x-y galvanometer set and the first focusing lens set are both connected with the upper computer, and controlled by the upper computer; the x-y galvanometer set comprises a first galvanometer lens, an x-vibration motor, and a y-vibration motor, and the x-vibration motor and the y-vibration motor respectively control the vibration of the first galvanometer lens in an x direction and a y direction, so that a focal point of the laser light is capable of moving in an x-y plane, and the x-y plane is the horizontal plane.

3. The laser cavitation composite ultrasonic cleaning device for the connecting rod according to claim 2, wherein the first focusing lens set comprises a guide rail, a third focusing lens, a fourth focusing lens, a first servo motor and a second servo motor, the third focusing lens, and the fourth focusing lens are connected with the guide rail through a slider and are capable of moving along an extension direction of the guide rail, the first servo motor, and the second servo motor are respectively connected with the third focusing lens and the fourth focusing lens, the first servo motor, and the second servo motor are both controlled by the upper computer, rotation frequencies of the first servo motor and the second servo motor are the same as a laser pulse frequency, and initial rotation angles of the first servo motor and the second servo motor are randomly generated by the upper computer.

4. The laser cavitation composite ultrasonic cleaning device for the connecting rod according to claim 3, wherein the second lens set comprises a second beam expanding and collimating lens set, a focusing and collimating lens set, a reflecting galvanometer set, a completely reflecting lens and a second focusing lens; and the second beam expanding and collimating lens set, the focusing and collimating lens set, the reflecting galvanometer set, the completely reflecting lens and the second focusing lens are sequentially arranged along the light emitting direction of the second laser, and the reflecting galvanometer set is connected with the upper computer, and controlled by the upper computer.

5. The laser cavitation composite ultrasonic cleaning device for the connecting rod according to claim 4, wherein the reflecting galvanometer set comprises a second galvanometer lens and a third servo motor, the second galvanometer lens is connected with the third servo motor, the second galvanometer lens is parallel to the completely reflecting lens, the third servo motor is controlled by the upper computer, a rotation frequency of the third servo motor is the same as the laser pulse frequency, and an initial rotation angle of the third servo motor is generated by the upper computer.

6. The laser cavitation composite ultrasonic cleaning device for the connecting rod according to claim 5, wherein the initial rotation angle $\theta$ of the third servo motor satisfies all the following conditions:
$\theta$ is incapable of being evenly divided by 360;
$\theta$ is no less than $(360*d)/(2\pi r)$;
a minimum common factor of $\theta$ and 360 is no greater than n;
wherein,
r is a circumferential radius of the bushing gap, in a unit of mm;
d is a distance between focal points of two adjacent pulse laser lights forming cavitation bubbles, in a unit of mm; and
n is a number of turns of the focal point of the laser light along the circumference of the bushing gap from a start to a dot that is dotted for the first time.

7. The laser cavitation composite ultrasonic cleaning device for the connecting rod according to claim 6, further comprises two infrared high-speed cameras, wherein the two infrared high-speed cameras are both connected with the upper computer, the two infrared high-speed cameras respectively aim at the bolt hole and the bushing gap for shooting, and a shooting treatment and a feedback process of any infrared high-speed camera are as follows:
transmitting a picture shot by the infrared high-speed camera to the upper computer, and pre-treating the picture
preliminarily positioning a light spot of the focal point;
carrying out curve fitting on an edge of the light spot by a fuzzification treatment and a binarization treatment to obtain a regular ellipse;
when a short axis of the ellipse is less than a preset length, reading coordinates of a center of the ellipse, otherwise, not reading the coordinates; and
carrying out a statistical treatment on coordinates of centers of all ellipses to judge whether a preset uniformity is satisfied; when the preset uniformity is not satisfied, adjusting positions of optical elements in the first lens assembly or the second lens assembly corresponding to the infrared high-speed camera to shoot again; and when the preset uniformity is satisfied, judging whether a preset number of times is continuously satisfied; when the preset number of times is continuously satisfied, suspending the shooting for a predetermined time, and when the preset number of times is not continuously satisfied, continuing the shooting.

8. The laser cavitation composite ultrasonic cleaning device for the connecting rod according to claim 7, wherein the preliminary positioning of the light spot of the focal point comprises color recognition and shape recognition, and specifically comprises the following steps:

carrying out a graying treatment on the picture, carrying out edge extraction by using a Prewitt operator, and then carrying out a binarization treatment to determine a search range of colored point pairs;

searching the colored point pairs; and carrying out the shape recognition to highlight the position of the light spot, and carrying out several morphological closing operations and erosion operations on the image to preliminarily determine the position of the light spot.

9. A laser cavitation composite ultrasonic cleaning method for a connecting rod, wherein the method uses the laser cavitation composite ultrasonic cleaning device for the connecting rod according to claim 1, and comprises a cleaning method for a bolt hole of the connecting rod, which specifically comprises the following steps of:

emitting pulsed laser light by a first laser, wherein the pulsed laser light passes through a first lens assembly and then is focused in a cleaning solution in the bolt hole;

exciting cavitation by the laser light to generate a microbubble nucleus in the cleaning solution;

allowing the bubble nucleus to rapidly grow and collapse under excitation of the low-frequency ultrasonic vibrator to generate a shock wave and a micro-jet; and cleaning an internal thread surface of the bolt hole by the micro-jet; and the method further comprises a cleaning method for a bushing gap, which specifically comprises the following steps:

emitting pulsed laser light by a second laser, wherein the pulsed laser light passes through a second lens assembly and then is focused in a cleaning solution inside the bushing gap of a small head hole of the connecting rod;

exciting cavitation by the laser light to generate a microbubble nucleus in the cleaning solution;

allowing the bubble nucleus to rapidly grow and collapse under excitation of the low-frequency ultrasonic vibrator to generate the shock wave and the micro-jet; and cleaning an interior of the bushing gap of the small head hole of the connecting rod.

10. The laser cavitation composite ultrasonic cleaning method for the connecting rod according to claim 9, further comprises:

shooting the bolt hole through an infrared high-speed camera, judging whether a statistical result of coordinates of a center of an ellipse in a picture treatment result satisfies a preset uniformity, and when the statistical result does not satisfy the preset uniformity, adjusting positions of optical elements in the first lens assembly to shoot again; and shooting the bushing gap through the infrared high-speed camera, judging whether the statistical result of the coordinates of the center of the ellipse in the picture treatment result satisfies the preset uniformity, and when the statistical result does not satisfy the preset uniformity, adjusting positions of optical elements in the second lens assembly to shoot again.

\* \* \* \* \*